(12) United States Patent  (10) Patent No.: US 9,395,037 B2
Ballhatchet  (45) Date of Patent: Jul. 19, 2016

(54) SECURE ENCLOSURE FOR A TABLET DISPLAY DEVICE

(71) Applicant: Thomas Ashley Ballhatchet, London (GB)

(72) Inventor: Thomas Ashley Ballhatchet, London (GB)

(73) Assignee: SPOTSPOT LIMITED, London (GB)

( * ) Notice: Subject to any disclaimer, the term of this patent is extended or adjusted under 35 U.S.C. 154(b) by 0 days.

(21) Appl. No.: 14/280,744

(22) Filed: May 19, 2014

(65) Prior Publication Data

US 2015/0327693 A1  Nov. 19, 2015

(51) Int. Cl.
F16M 11/40 (2006.01)
F16M 13/02 (2006.01)
A47F 5/08 (2006.01)
F16M 11/04 (2006.01)
G06F 1/16 (2006.01)

(52) U.S. Cl.
CPC .............. *F16M 13/02* (2013.01); *A47F 5/0861* (2013.01); *F16M 11/04* (2013.01); *F16M 11/041* (2013.01); *F16M 11/40* (2013.01); *F16M 13/022* (2013.01); *G06F 1/16* (2013.01); *G06F 1/1675* (2013.01)

(58) Field of Classification Search
USPC .............................. 248/160, 149; 403/123, 56
See application file for complete search history.

(56) References Cited

U.S. PATENT DOCUMENTS 2,111,368 A * 3/1938 Kron ............................. 248/160
4,842,174 A * 6/1989 Sheppard et al. ............. 224/548
7,712,712 B2 * 5/2010 Richter ......................... 248/161

* cited by examiner

*Primary Examiner* — Alfred J Wujciak

(74) *Attorney, Agent, or Firm* — Dekel Patent Ltd; David Klein

(57) ABSTRACT

A secure enclosure for a tablet display device includes a tablet display device holder defining a cavity for receiving a tablet display device and a flexible stalk having first and second ends. The first end of the stalk is fixed to the tablet display device holder and the second end is adapted to be mounted to a surface. The flexible stalk comprises a flex hose having a first end and a second end, and an end fitting fixed around the first end of the flex hose at the first end of the flexible stalk.

11 Claims, 5 Drawing Sheets

SECURE ENCLOSURE FOR A TABLET DISPLAY DEVICE

TECHNICAL FIELD

The present invention relates to a secure enclosure for a tablet display device.

BACKGROUND TO THE INVENTION AND PRIOR ART

The ubiquity of tablet display devices is increasing. Due to their compact nature and convenient user interface, there is a desire to use such devices in the retail environment and in other locations where the devices are accessible to the general public. Tablet devices are sought after by thieves and in order to confidently use such devices in a place which is readily accessible to the public there is need to provide a secure enclosure which will resist theft attempts.

Secure enclosures for tablet devices are known. These devices typically include a tablet device holder comprising a faceplate which is attached to a case by inserting an end of the faceplate into engagement with a lip on the case. The opposed end of the faceplate is then secured to the case by means of the lock. In other known devices the faceplate is attached to the case using screws.

Such enclosures may also include a stand for attaching the tablet device holder to a horizontal surface, such as a counter top, or to a vertical surface, such as a wall. In an environment where the tablet is to be viewed whilst standing such as in a store, the stand also functions to raise the tablet above the level of a horizontal surface. So that the tablet display device can be viewed at a convenient angle, for example without encountering screen glare, the stalk of the stand may be flexible to allow tilting of the enclosure.

Such flexible stands are typically made from stripwound hose. A stripwound hose is made of a loosely interlocking helical coil. The ends of the hose are fixed into end fittings, one of which is attached to the tablet display holder and the other end of which is attached to the surface on which the enclosure is to be mounted.

A problem with using stripwound hose for this purpose is as follows. Users of the tablet may twist the tablet holder and the hose must accommodate this without breaking or coming apart. If the stripwound flexible hose is threaded into end fittings the hose can be easily untwisted. If the ends of the flexible hose are glued into the end fixtures then when the flexible hose is twisted in one direction its diameter decreases, and when twisted the other way its diameter increases. This change in diameter mechanically abrades any adhesive, causing the join to fail after limited use.

It is an aim of the present invention to provide an improved flexible stand for use in a tablet display device enclosure.

SUMMARY OF INVENTION

According to a first aspect of the invention, there is provided a secure enclosure for a tablet display device comprising: a tablet display device holder defining a cavity for receiving a tablet display device, and a flexible stalk having first and second ends, the second end being adapted to be mounted to a surface, the flexible stalk comprising: a flex hose having a first end and a second end, and a first end fitting fixed around the first end of the flex hose at the first end of the flexible stalk, the end fitting comprising: an inner compression fixing, an outer compression fixing fixed to the tablet display device holder and a gripping part disposed between the inner and outer compression fixings, the inner and outer compression fixings having compression parts for urging the gripping part to grip the flex hose when the inner compression fixings is moved towards the outer compression fixing, the inner and outer compression fixings further having engagement portions for impeding separation of the inner and outer compression fixings.

The gripping part may be a split ring olive.

The inner compression fixing and the olive may surround the flex house and part of the outer compression fixing may be inserted into the flex hose.

Movement of the inner compression fixing towards the outer compression fixings may cause the olive to squeeze the flex hose between the olive and the part of the outer compression fixing which is inserted into the flex hose.

The engagement portions of the inner and outer compression fixings may be threads.

The inner and outer compression fixings may each have a longitudinal axis and the compression parts may be inner walls of the inner and outer compression fixings which are inclined to the respective longitudinal axes.

The flex hose may be a stripwound hose.

The outer compression fixing may further comprise a pair of spanner flats, the end fitting further comprising a decorative ring for covering the spanner flats.

The inner compression fixing may have an outer surface, a plurality of longitudinal flutes being formed in the outer surface.

The enclosure may further comprise a second end fitting around the second end of the flex hose at the second end of the flexible stalk, the second end fitting being adapted to secure the enclosure to a surface.

The tablet display device holder may comprise a case and a faceplate for securely closing the case, the outer compression fixing being fixed to the case.

BRIEF DESCRIPTION OF THE DRAWINGS

The invention will now be described by way of example with reference to the drawings, in which.

DETAILED DESCRIPTION OF THE DRAWINGS

Figure 1:
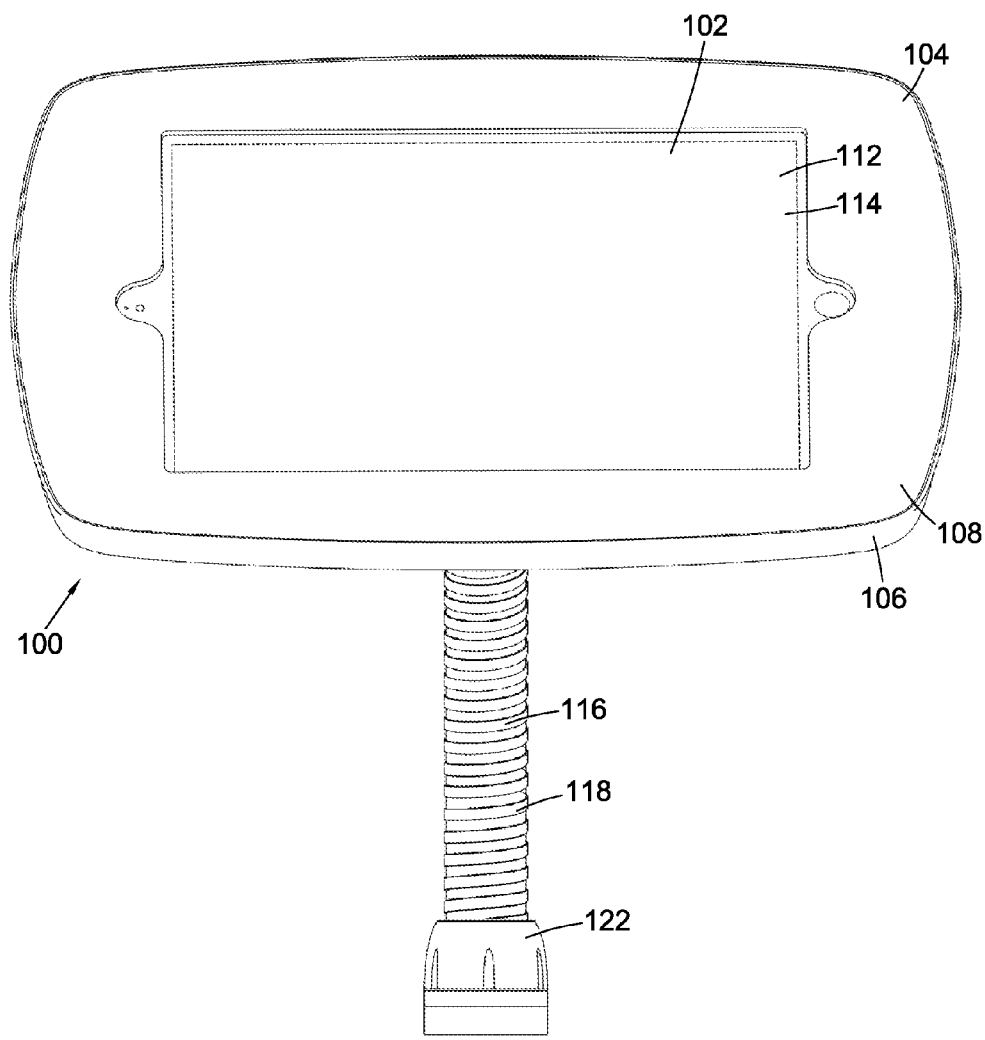
FIG. 1 is a front view of a secure enclosure for a tablet display device forming an embodiment of the invention.
Figure 2:
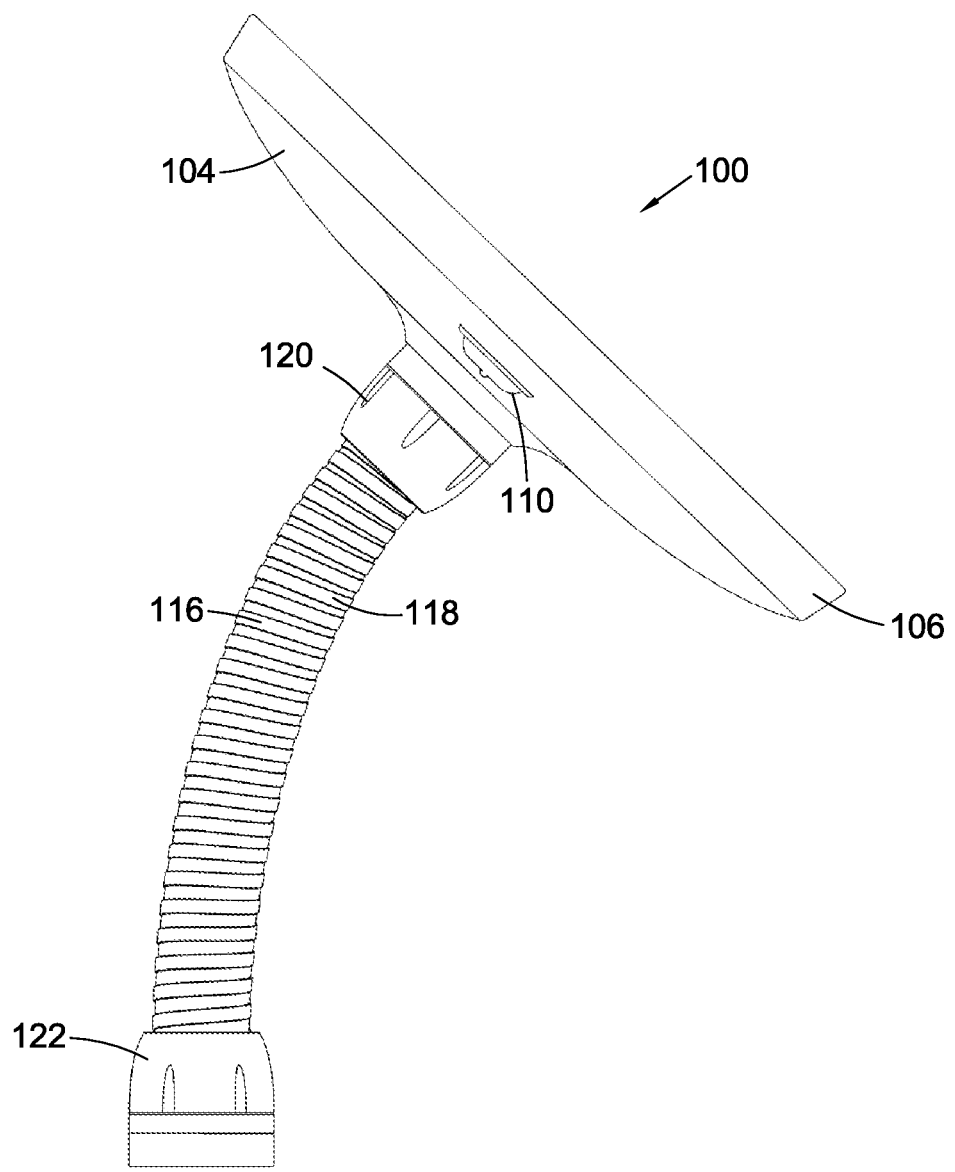
FIG. 2 is side view of the secure enclosure of FIG. 1.
Figure 3:
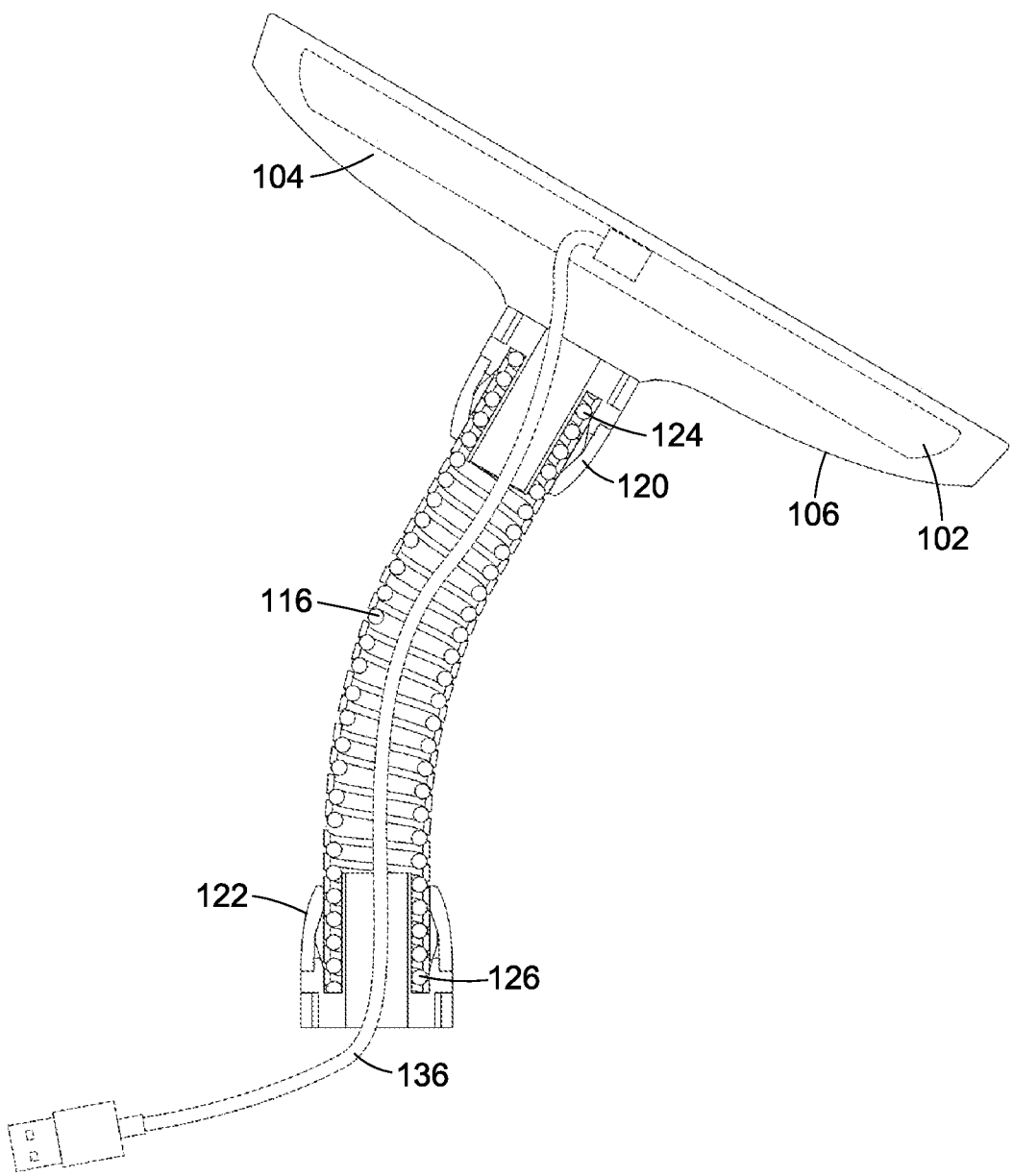
FIG. 3 is a partial sectional view through the secure enclosure shown in FIG. 2.

FIGS. 1 to 3 show a secure enclosure 100 for a tablet display device 102 forming an embodiment of the invention. The secure enclosure 100 comprises a tablet display device holder 104 which is formed from a case 106 and a faceplate 108. The case 106 and faceplate 108 define therebetween a cavity for receiving the tablet display device 102 within the holder 104. The faceplate 108 is held securely to the case 106 by means of a latch mechanism (not shown) which is operated by a lock 110. A faceplate through-hole 112 within the faceplate 108 allows access to a screen 114 of the tablet display device 102.

The secure enclosure 100 further comprises a flexible stalk 116 which functions as a stand for the holder 104. The flexible stalk 116 comprises a flex hose 118 having an end fitting 120, 122 at each of its respective ends 124, 126. The upper end 124 of the flexible stalk 116 is attached to the device holder 104 at the case 106 by means of the upper end fitting 120. The lower end 126 of the flexible stalk 116 can be mounted to a surface, such as a counter top or wall by means of the lower end fitting 122. In order to simplify the manufacture of the enclosure 100 the end fittings 120, 122 are identical.

Figure 4:
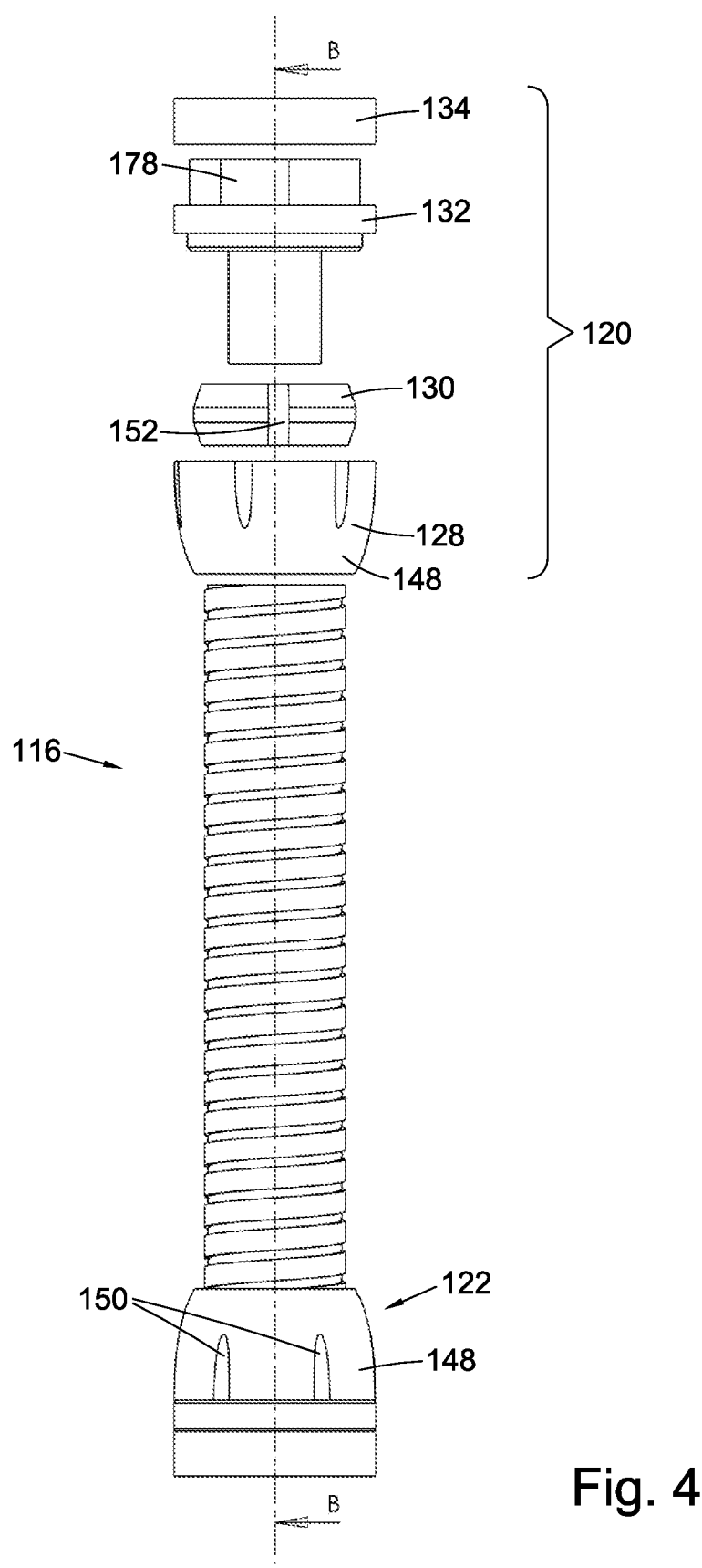
FIG. 4 is a partially exploded view of a flexible stalk of the secure enclosure of FIG. 1.
Figure 5:
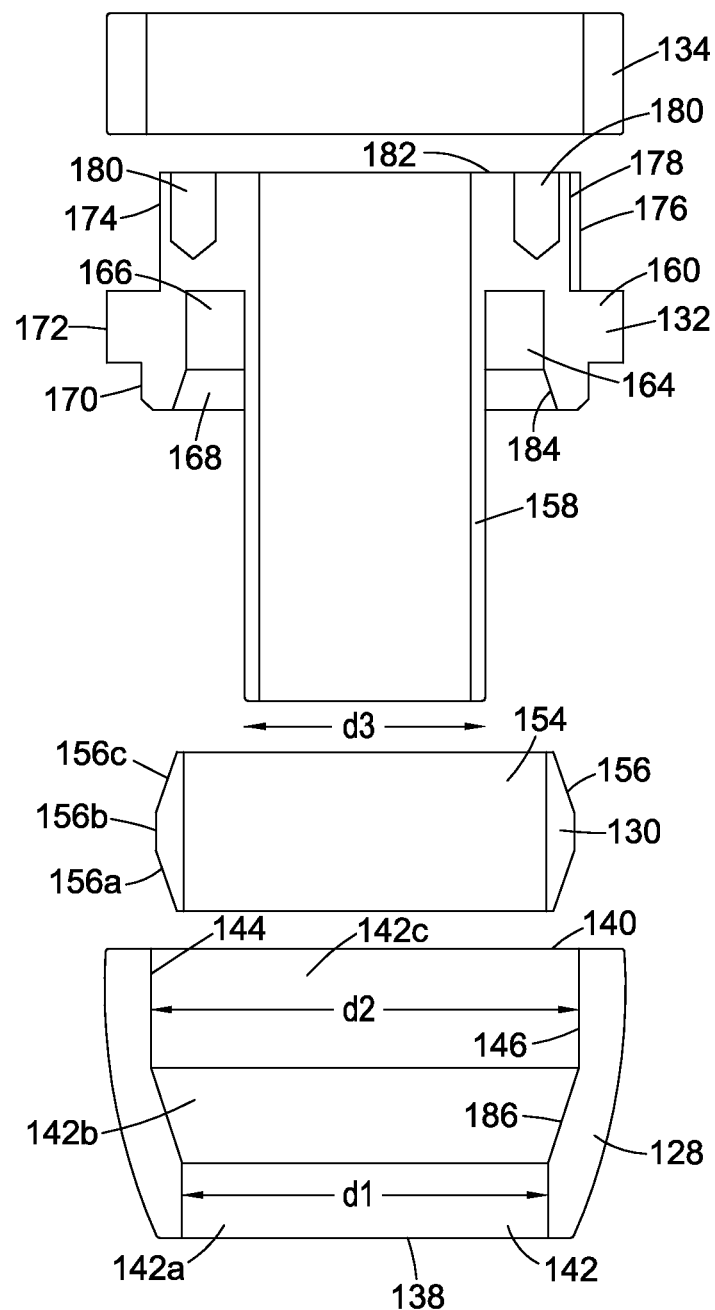
FIG. 5 is a sectional view of parts of end fittings of the flexible stalk of the secure enclosure of FIG. 1.

FIG. 4 is a partially exploded view of the flexible stalk 116 in which the components of the end fittings 120, 122 are visible. These components are shown in sectional view in FIG. 5.

Each end fitting 120, 122 is comprised of an inner compression fixing 128, an olive 130, an outer compression fixing 132 and a decorative ring 134. Each of these components is annular, having an internal bore, such that in the assembled end fitting 122, 122 the bores align to form a continuous bore through which runs a tablet cable 136 (shown in FIG. 3).

The inner compression fixing 128 has a first mouth 138 and a second mouth 140 which are connected by bore 142 which runs along a longitudinal axis of the inner compression fixing 128. The bore 142 has three sections 142a-c along its length. The first section 142a which opens to the first mouth 138 is cylindrical, having a constant diameter d1 and having a circumferential wall which is parallel to the axis of the bore 142. The diameter d1 is slightly greater than the diameter of the flex hose 118 so that the inner compression fixing 128 can be fed onto the flex hose 118. The second section 142b has a frusto-conical shape which widens from the first diameter d1 to a second diameter d2. In other words, a wall of the second section 142b of the bore 142 is inclined to the longitudinal axis of the bore 142. The third section 142c which opens to the second mouth 140 is cylindrical, having a diameter d2. An end part 144 of an inner wall 146 at the second mouth is threaded. As can be seen from FIGS. 1-4, the external surface 148 of the inner compression fixing 128 has a number of longitudinal flutes 150 around its periphery.

The olive 130 is a split ring which has a gap 152 (shown in FIG. 4) along its circumference where it is split. The olive 130 has a cylindrical bore 154 of diameter similar to d1. The external surface 156 of the olive has three sections 156a-c. The central section 156b has a constant diameter. The two end sections 156a,c taper radially to the same degree, such that the external surface 156 is longitudinally symmetrical.

The outer compression fixing 132 is generally T-shaped, having a tubular skirt 158 which descends from a body 160. The outer compression fixing 132 has a constant diameter cylindrical bore 162. The skirt 158 forms part of the wall of the bore 162 and the outer diameter d3 of the skirt 158 is similar to the inner diameter of the flex hose 118 so that the skirt 158 can be snuggly inserted into the flex hose 118.

An annular channel or groove 164 is formed in the body 156 at a foot of the skirt 158. A root 166 of the channel 164 has a uniform width. An outer wall 184 of groove is inclined to a longitudinal axis of the outer compression fixing to form an outwardly flared mouth 168 having a frusto-conical shape. An external surface 170 of the body 156 around the mouth 168 is threaded for engagement with the threaded portion 144 of the inner compression fixing 128. Beyond that surface 170, the body 160 widens to form an annular flange 172 which has a diameter similar to the outer diameter of the inner compression fixing 128 at the second mouth 140. A portion 174 of the external surface 176 beyond the annular flange 172 (distal to the skirt 158) has a generally cylindrical shape other than parallel chords forming spanner flats 178, one of which is more clearly visible in FIG. 4. There are four threaded mounting bores 180 spaced around an end face 182 of the body 160 distal to the skirt 158, two of which are visible in FIG. 5.

The decorative ring 134 is a round ring having uniform radial thickness. The height of the decorative ring 134 matches the height of the portion 174 of the external surface 176 of the outer compression fixing 132 beyond the annular flange 172. The outer diameter of the decorative ring 134 matches the diameter of the annular flange 172 of the outer compression fixing 132 and the outer diameter of the inner compression fixing 128 at the second mouth 140.

To assemble the flexible stalk 116 the inner compression fixing 128 is first fed on to the flex hose 118, followed by the olive 130. The skirt 158 of the outer compression fixing 132 is then inserted fully into the flex hose 118 so that an end 184 of the flex hose 118 is fully inserted into the root 166 of the annular channel 164 of the outer compression fixing 132. The olive 130 is then slid along the flex hose 118 until it abuts the outer compression fixing 132. Glue is applied to one or both of the threaded end part 144 of the inner wall 146 of the inner compression fixing 128 and the threaded external portion 170 of the outer compression fixing 132. The inner compression fixing 128 is then moved into contact with the outer compression fixing 132 and rotated relative to the outer compression fixing 132 to engage the two threaded portions 144, 170.

As engagement of the threaded portions 144, 170 increases the inner compression fixing 128 and the outer compression fixing 132 draw closer to urge an inner wall 186 of the frusto-conical second section 142b of the bore 142 of the inner compression fixing 128 against the tapered end section 156a of the olive and to urge a wall 184 of the mouth 168 of the annular channel 164 of the outer compression fixing 132 against the tapered end section 156c of the olive 130. In this manner the inner wall 186 of the frusto-conical second section 142b of the bore 142 of the inner compression fixing 128 and the inner wall 184 of the mouth 168 of the annular channel 164 of the outer compression fixing 132 act as compression parts on the end sections 156a,c of the olive 130, to compress or squeeze the olive 130 to close the gap 152 in its circumference. As the olive 130 is squeezed it applies a force to the flex hose 118 to grab the flex hose 118 between the olive 130 and the skirt 158 of the outer compression fixing 132, thereby acting as a gripping part to secure or fasten the end fitting 120, 122 to the flex hose 118. In this manner the inner compression fixing 128 acts as a tightening ring for the end fitting 120, 122. To tighten the end fitting 120, 122 further a spanner can be used on the spanner flats 178 and the inner compression fixing 128 can be gripped at the flutes 150.

Once the end fitting 120, 122 has been secured to the flex hose 118, the decorative ring 134 is place over the end portion 174 of the outer compression fixing 132 and the fitting 120 is attached to the device holder 104 by inserting mounting screws (not shown) through the case 106 into the threaded mounting bores 180. Similarly, the lower end fitting 122 can be attached to a surface by passing screws through the surface into engagement with the threaded mounting bores 180. Since the outer diameters of the decorative ring 134, the annular flange 172 and the inner compression fixing 128 at the second mouth 140 are similar, in the assembled end fittings they give the appearance of a continuous outer surface.

Once the flexible stalk 116 has been attached at the upper end fitting 120 to the case 106 and at the lower end fitting 122 to a surface, the decorative ring 134 covers the spanner flats 178, rendering them inaccessible. The only way, therefore, of loosening the threaded connection between the inner compression fixing 128 and the outer compression fixing 132 is by twisting the inner compression fixing 128, however the glued connection between the threaded portions is strong enough to prevent this.

Unlike prior art arrangements, the flex hose 118 is not glued to the end fittings but is held in compression between the olive 130 and the outer compression fixing 132. Hence, if the device holder 104 is rotated in one direction relative to the flex hose 118, this will cause the flex 118 to tightly grip the skirt 158 of the outer compression fixing 132 and if the device holder 104 is rotated in the other direction relative to the flex hose 118, this will cause the flex 118 to push tightly against the olive 130. Hence the connection between the flex hose 118, the olive 130 and the outer compression fixing 132 will not be weakened by rotating the device holder 104 in either direction.

Various modifications will be apparent to those in the art and it is desired to include all such modifications as fall within the scope of the accompanying claims.

For example, in the embodiment described above the inner 128 and outer 132 compression fixings squeeze the split ring olive 130 to grip the flex hose 118. In other embodiments the olive 130 may be replaced with a deformable continuous (non-split) deformable ring, which may be made of rubber, such as a circular cross section sealing washer or the like. Alternatively, the gripping part may comprise a plurality of circumferentially spaced cantilevered fingers having ridges on the inner surface of the distal ends, for engagement with the flex hose.

In the embodiment described above the inner 128 and outer 132 compression fixings have threaded portions so that relative rotation draws these parts nearer together and exerts a force on the olive. In other embodiments these parts may have other engagement portions, such as a ratchet arrangement having one or more pawl and a rack of teeth (similar to the fastening arrangement commonly used in nylon cable ties), wherein pushing the inner and outer compression fixings together linearly causes locking of the teeth and pawl(s) and impedes separation of the inner and outer compression fixings.

In the embodiment described above the flex hose is a stripwound hose. In other embodiments the flex hose may be made of other rigidly repositionable tubes.

In the embodiment described above the tablet display device holder 104 is formed from a case 106 and a faceplate 108. In other embodiments the tablet display device holder may have other configurations. For example, the holder may have clamshell design of substantially equal sized halves, or the tablet may be slid into a case from one end with a small door to close the opening.

What is claimed is:

1. A secure enclosure for a tablet display device comprising:
    a tablet display device holder defining a cavity for receiving a tablet display device, and
    a flexible stalk having first and second ends, the second end being adapted to be mounted to a surface, the flexible stalk comprising:
        a flex hose having a first end and a second end, and
        a first end fitting fixed around the first end of the flex hose at the first end of the flexible stalk, the end fitting comprising:
            an inner compression fixing, an outer compression fixing fixed to the tablet display device holder and a gripping part disposed between the inner and outer compression fixings, the inner and outer compression fixings having compression parts for compressing the gripping part against the flex hose to grip the flex hose when the inner compression fixing is moved towards the outer compression fixing, the inner and outer compression fixings further having engagement portions for impeding separation of the inner and outer compression fixings.

2. A secure enclosure as claimed in claim 1, wherein the gripping part is a split ring olive.

3. A secure enclosure as claimed in claim 2, wherein the inner compression fixing and the olive surround the flex house and part of the outer compression fixing is inserted into the flex hose.

4. A secure enclosure as claimed in claim 3, wherein movement of the inner compression fixing towards the outer compression fixings causes the olive to squeeze the flex hose between the olive and the part of the outer compression fixing which is inserted into the flex hose.

5. A secure enclosure as claimed in claim 1, wherein the engagement portions of the inner and outer compression fixings are threads.

6. A secure enclosure as claimed in claim 1, wherein the inner and outer compression fixings each have a longitudinal axis and the compression parts are inner walls of the inner and outer compression fixings which are inclined to the respective longitudinal axes.

7. A secure enclosure as claimed in claim 1, wherein the flex hose is a stripwound hose.

8. A secure enclosure as claimed in claim 1, the outer compression fixing further comprising a pair of spanner flats, the end fitting further comprising a decorative ring for covering the spanner flats.

9. A secure enclosure as claimed in claim 1, the inner compression fixing having an outer surface, a plurality of longitudinal flutes being formed in the outer surface.

10. A secure enclosure as claimed in claim 1, further comprising a second end fitting around the second end of the flex hose at the second end of the flexible stalk, the second end fitting being adapted to secure the enclosure to a surface.

11. A secure enclosure as claimed in claim 1, wherein the tablet display device holder comprises a case and a faceplate for securely closing the case, the outer compression fixing being fixed to the case.

* * * * *